United States Patent [19]

Dohrs

[11] Patent Number: 4,750,414
[45] Date of Patent: Jun. 14, 1988

[54] BIRD ROASTING ASSEMBLY AND METHOD

[76] Inventor: Mary E. Dohrs, 545 Haverhill Rd., Bloomfield Hills, Mich. 48013

[21] Appl. No.: 899,054

[22] Filed: Aug. 22, 1986

[51] Int. Cl.$^4$ .......................... A47J 37/04; A47J 43/18
[52] U.S. Cl. .................................. 99/419; 99/421 R; 99/421 H; 211/204; 248/164
[58] Field of Search ................ 99/419, 421 R, 421 A, 99/421 H, 421 HH, 449; 248/164; 211/204; 126/9 R, 9 B; 268/164

[56] References Cited

U.S. PATENT DOCUMENTS

| | | | |
|---|---|---|---|
| 2,634,674 | 4/1953 | Irwin | 99/419 |
| 2,727,564 | 12/1955 | Gruber | 248/164 U X |
| 2,787,948 | 4/1957 | Mathis | 99/421 R |

FOREIGN PATENT DOCUMENTS

| | | | |
|---|---|---|---|
| 845826 | 5/1939 | France | 99/421 H |
| 1473195 | 2/1967 | France | 99/421 H |
| 2355488 | 1/1978 | France | 99/421 A |

Primary Examiner—James K. Chi
Attorney, Agent, or Firm—Reising, Ethington, Barnard, Perry & Milton

[57] ABSTRACT

A poultry roasting assembly and a method of making same for suspending a bird horizontally over a pan of water by a spit rod inserted under the back bone. The assembly includes a first U-shaped member (14) having a pair of parallel arms (16) extending out from a base section (18). The parallel arms (16) extend in the same direction perpendicularly from opposite ends of the base section (18). A second U-shaped member (20) is included and has the same configuration as the first U-shaped member (14) but with shorter arms (16). A pivot pin (38) pivotally attaches the first U-shaped member (14) to the second U-shaped member (20) at a point (22) spaced from the distal ends (24) of each of the parallel arms (16) so that the distal ends (24) of the arms (16) form a V-shaped configuration (26) above the pivotal attachment (22) when the base sections (16) are pivoted apart, thereby forming a support structure for the spit rod.

6 Claims, 2 Drawing Sheets

U.S. Patent   Jun. 14, 1988   Sheet 1 of 2   4,750,414
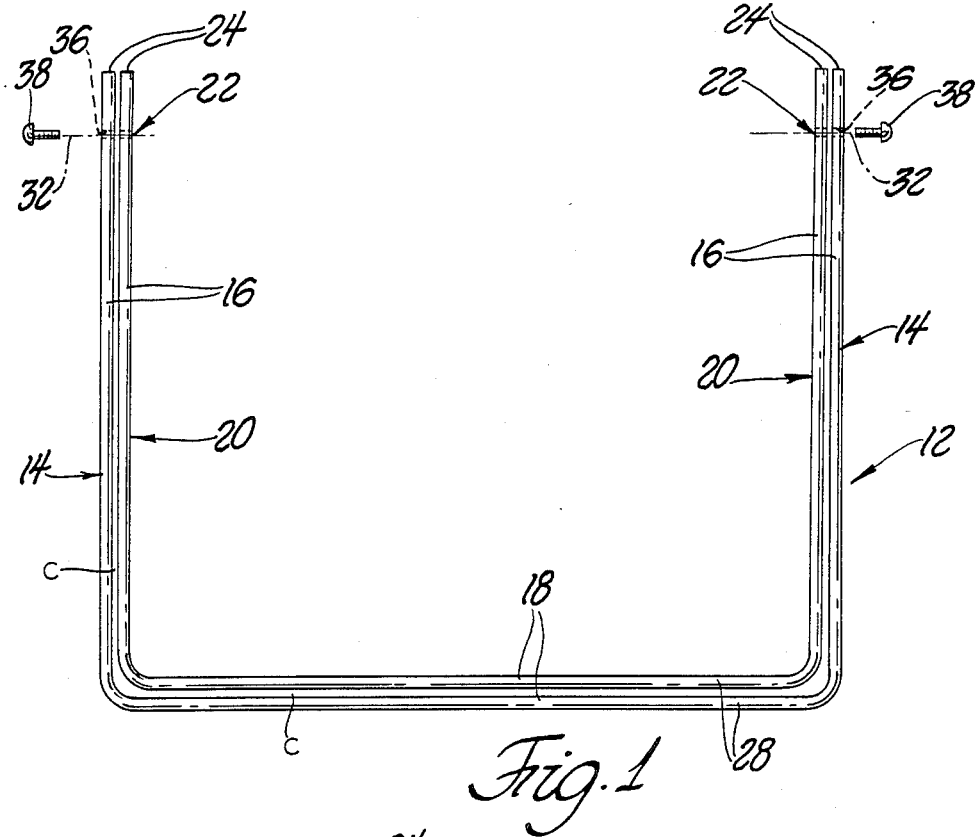
Fig. 1
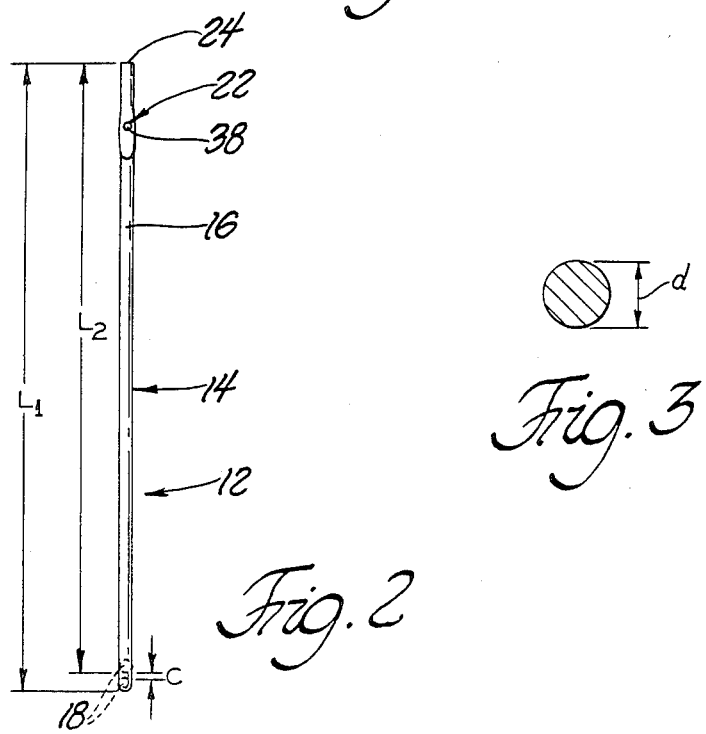
Fig. 2
Fig. 3

BIRD ROASTING ASSEMBLY AND METHOD

TECHNICAL FIELD

The invention relates to a roasting assembly to support poultry for roasting in an oven.

BACKGROUND OF THE INVENTION

The conventional method of roasting poultry is to tie the legs together and place the bird on its back in a roasting pan. Because most of the fat, and the gelatin-yeilding bones are located in the back of the chicken, this conventional cooking method causes the juices to either stay in the back, or to run into the pan. Furthermore, the white meat is exposed to the dry heat, which results in the white meat becoming very dry.

There are assemblies on the market which stand the bird upright, on its legs, but this also causes juices to run out of the bird into the pan.

SUMMARY OF THE INVENTION AND ADVANTAGES

The instant invention provides a poultry roasting assembly formed by bending a rod-like member into a U-shaped configuration having a pair of parallel arms extending out from a base section. The parallel arms both extend in the same direction perpendicularly from opposite ends of the base section. A second U-shaped member is formed from a second rod-like member into the same configuration as that of the first U-shaped member. The first U-shaped member is attached to the second U-shaped member at a pivotal connection spaced from the distal end of each of the parallel arms so that the distal ends of the U-shaped member form a V-shaped configuration above the pivotal connection as a result of pivoting the base sections apart.

The subject invention provides a free folding rack designed to support poultry from its backbone on a separate rod allowing the legs and wings to hang free and away from the body to promote faster and more even cooking. A major amount of fat and juice sacks are located along the backbone and during roasting, juices drain down into the meaty parts of the bird. The minimal juices which drip off the bird would burn if allowed to remain unattented in the pan under the bird, therefore water is added to the pan to in turn, steam the thickest parts of the meat thereby cutting the roasting time by approximately one third. The end result is an extremely juicy, tender, and evenly cooked product.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a front view of the subject invention in the folded storage position;

FIG. 2 is a side elevational view;

FIG. 3 is an enlarged cross-sectional view of the rod from which the poultry roasting apparatus is made;

DESCRIPTION OF THE PREFERRED EMBODIMENT

Figure 4:
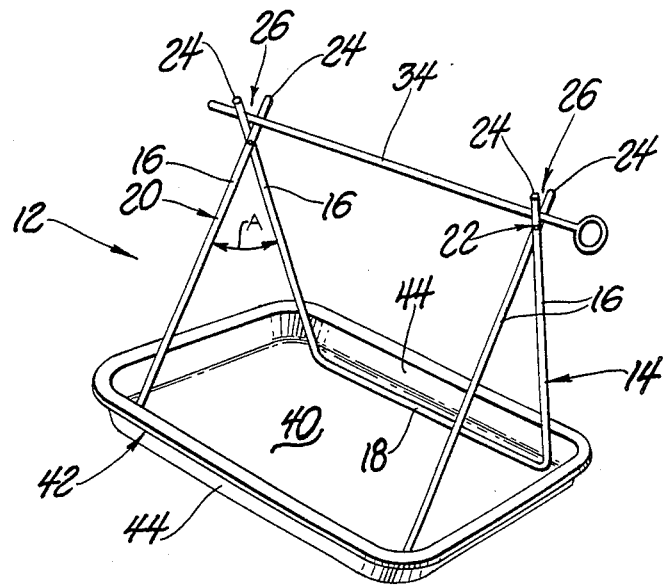
FIG. 4 is a perspective view of the assembly supported in a roasting pan.
Figure 5:
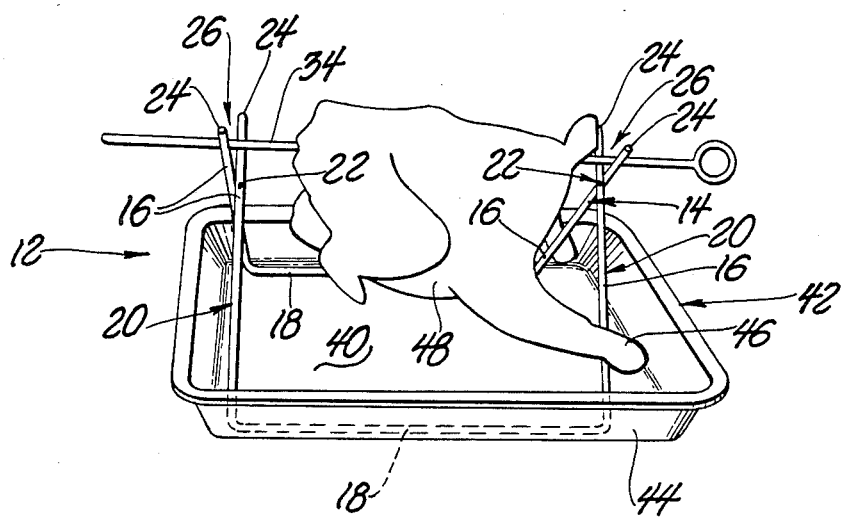
FIG. 5 is a perspective view of the invention supporting a chicken in a pan.

An assembly for roasting poultry, constructed according to the present invention, is generally shown at 12. The assembly includes a first U-shaped member 14, having a pair of parallel arms 16 extending out from a base section 18. The parallel arms 16 extend perpendicularly from opposite ends of the base section 18, both arms 16 extending from the base section 18 in the same direction. A second U-shaped member 20 formed from the same material as the first U-shaped member, has the identical configuration as the first U-shaped member but with shorter arms. Both U-shaped members are formed from a metal rod having a circular cross section, as best shown in FIG. 3.

The first U-shaped member 14 is pivotally attached to the second U-shaped member 20 at a pivot connection means 22 spaced from the distal end 24 of each of the parallel arms 16, so that the distal ends 24 of the arms 16 form a V-shaped configuration 26 above the pivotal attachment 22 when the base sections 18 are pivoted apart.

The parallel arms 16 of the first U-shaped member 14 have a length L1 which is longer then the length L2 of the parallel arms of the second U-shaped member 20 by an amount d+c which is equal to the diameter d of the rod 28 from which the first U-shaped member 14 is formed, plus a clearance amount c. The base section 18 of the first U-shaped member 14 is longer then the base section 18 of the second U-shaped member 20 by an amount 2d+2c where d is the diameter of the rod 28 and c is a clearance amount. The difference in size allows the second U-shaped member 20 to be attached to the inner sides of the parallel arms 16 of the first U-shaped member 14 so that the second U-shaped member 20 swings freely through the first U-shaped member 14 on a pivotal axis 32 at the pivot connection means 22 and the assembly can thereby be easily folded for storage.

A spit rod 34 may be formed from the same metal material as the U-shaped member.

A hole 36 extends through the parallel arms 16 in a direction parallel to the base sections 18 at a position near the distal ends 24 of each of the four parallel arms 16. Each of the holes 36 in the parallel arms of the first U-shaped member 14 lines up and pairs with a corresponding hole in the parallel arm of the second U-shaped member 20. A pin member or rivet 38 extends through each pair of lines up holes 36.

The base 18 of the assembly 12 is placed on the bottom 40 of a roasting pan 42. The pan 42 is of a size complimentary to the apparatus 12 having at least two opposite disposed side walls 44 which are substantially upright or vertical so as to prevent the base members 18 from sliding outwardly. The walls 44 are spaced sufficiently far apart so as to dispose the parallel arms 16 at a satisfactory angle in order to form the V-shaped prop 26.

The poultry roasting assembly is formed by bending a rod member 28 into a U-shaped configuration 14 having a pair of parallel arms 16 extending out from a base section 18, so that each parallel arm 16 extends perpendicularly from the opposite end of the base section 18 as the other arm 16, and with both arms 16 extending from the base section 18 in the same direction. A second U-shaped member 20 is formed from a second rod member 28 into a configuration identical to that of the first U-shaped member 14 but with shorter arms 16.

The first U-shaped member 14 is pivotally attached to the second U-shaped member 20 at a connection 22 near the distal end 24 of each of the parallel arms 16 so that the distal ends 24 of the U-shaped member 14 and 20 form a V-shaped configuration or prop 26 above the pivotal connection 22.

The second U-shaped member 20 is formed so that the length L2 of the parallel arms 16 are shorter than the parallel arms 16 of the first U-shaped member 14 by an amount d+c where d is the diameter of the rod 28 and c is a clearance amount.

The spit rod 24 is inserted into a bird longitudinally and under or ventrally of the backbone and the spit rod 34 is then propped in the V-shaped configuration or prop 26. The legs 46 of the bird may be propped on the parallel arms 16 of the poultry roasting assembly 12, thereby holding them away from the body 48 and preventing a bird from tipping to the right or to the left, especially if the bird is very large. The assembly 12 is placed in a roasting pan 40 of a size complimentary to the assembly 12 so that the base 18 of the assembly 12 may be placed in abutment with the vertical walls 44 of the pan 42 so as to prevent the bases 18 of the assembly 12 from sliding outwardly when the assembly 12 is placed in the roasting pan and so as to dispose the parallel arms 16 of the apparatus 12 at a satisfactory angle in order to form a prop 26 above the pivotal attachment 22. Water is poured into the roasting pan in minimal amount and the pan is placed in the oven to roast the bird. The water prevents the juices dripping from the bird from burning. The juices mixed with water in the pan blends to form a gravy The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An assembly (12) for roasting poultry comprising; a first U-shaped member (14) having a pair of parallel arms (16) extending out from a base section (18), said parallel arms (16) extending perpendicularly from opposite ends of said base section (18), both of said arms (16) extending from said base section (18) in the same direction; a second U-shaped member (20) having the same configuration as the first U-shaped member (14) and having the length (L1) of said parallel arms (16) of said first U-shaped member (14) longer than the length (L2) of said parallel arms (16) of said second U-shaped member (20); and a pivot means (22) pivotally attaching said first U-shaped member (14) to the inner sides (30) of said parallel arms (16) of said second U-shaped member (20) on a pivotal axis (32) spaced from the distal ends (24) of each of said parallel arms (16) so that said second U-shaped member (20) swings freely through said first U-shaped member (14) on said pivotal axis (32) at said pivot means (22); said distal ends (24) of said arms (16) forming a V-shaped configuration (26) above said pivotal axis (32) as a result of pivoting said base sections apart.

2. An assembly as set forth in claim 1 further characterized by said length (L2) of said arms (16) of said second U-shaped member (20) being shorter by an amount d+c wherein d is equal to the diameter of said first U-shaped member (14) and c equals a clearance between said U-shaped members.

3. An apparatus as set forth in claim 1 further characterized by including a spit rod (34) for resting in said V-shaped configuration (26).

4. An apparatus as set forth in claim 3 further characterized by said pivot means (22) including a hole (36) extending through each of said four parallel arms (16) in a direction parallel to said base sections (18);
each of said holes (36) in said parallel arms (16) of said first U-shaped member (14) lining up and paired with a corresponding hole (36) in one of said parallel arms (16) of said second U-shaped member (20);
a pin member (38) extending through each pair of said lined up holes (36).

5. An apparatus as set forth in claim 1 further characterized by a roasting pan (40) of a size complimentary to said assembly (12) so that said base sections (18) may be placed on the bottom (42) of said roasting pan (38);
said pan having at least two oppositely disposed side walls (44) being substantially vertical so as to prevent said base sections (18) of said assembly (12) from sliding outwardly;
said side walls (44) being spaced sufficiently far apart so as to dispose said parallel arms (16) at a satisfactory crossing angle to form said V-shaped configuration when said assembly (12) is placed in said roasting pan (40).

6. An apparatus as set forth in claim 5 further characterized by each of said U-shaped members comprising a rod member.

* * * * *